US006903156B2

(12) United States Patent
Müller et al.

(10) Patent No.: US 6,903,156 B2
(45) Date of Patent: Jun. 7, 2005

(54) STRIPPABLE COATING COMPOSITIONS

(75) Inventors: Hanns-Peter Müller, Odenthal (DE); Horst Gruttmann, Leverkusen (DE); Joachim Petzoldt, Monheim (DE); Heino Müller, Leverkusen (DE); Christoph Irle, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 331 days.

(21) Appl. No.: 09/799,238

(22) Filed: Mar. 5, 2001

(65) Prior Publication Data

US 2001/0029279 A1 Oct. 11, 2001

(30) Foreign Application Priority Data

Mar. 8, 2000 (DE) .......................................... 100 11 277

(51) Int. Cl.$^7$ .............................................. C08L 51/00
(52) U.S. Cl. ........................ 524/504; 524/457; 524/501; 524/507; 524/589; 524/591; 524/839
(58) Field of Search ............................... 524/457, 501, 524/504, 507, 589, 591, 839

(56) References Cited

U.S. PATENT DOCUMENTS

| 4,335,029 | A | * | 6/1982 | Dabi et al. ................. 524/589 |
| 4,622,360 | A | | 11/1986 | Gomi et al. ................ 524/507 |
| 4,644,030 | A | * | 2/1987 | Loewrigkeit et al. ....... 524/457 |
| 5,137,961 | A | * | 8/1992 | Goos et al. ................. 524/457 |
| 5,141,987 | A | * | 8/1992 | Nachtkamp et al. ......... 524/591 |
| 5,204,404 | A | * | 4/1993 | Werner et al. ............... 524/501 |
| 5,412,023 | A | * | 5/1995 | Hille et al. .................. 524/539 |
| 5,492,961 | A | * | 2/1996 | Brock et al. ................ 524/539 |
| 5,945,473 | A | * | 8/1999 | Kielbania et al. ........... 524/457 |
| 5,965,195 | A | | 10/1999 | Müller et al. ............... 427/155 |
| 6,001,915 | A | * | 12/1999 | Schwarte et al. ........... 524/457 |
| 6,084,051 | A | * | 7/2000 | Blum et al. ................. 528/71 |
| 6,149,970 | A | | 11/2000 | Frigge et al. ................ 427/154 |
| 6,172,126 | B1 | | 1/2001 | Müller et al. ............... 521/49 |
| 6,329,020 | B1 | * | 12/2001 | Patzschke et al. ....... 427/407.1 |
| 6,342,558 | B1 | * | 1/2002 | Grandhee ................... 524/457 |
| 6,384,131 | B1 | * | 5/2002 | Kinney et al. .............. 524/591 |
| 6,395,820 | B1 | * | 5/2002 | Lindenmuth et al. ....... 524/501 |
| 6,552,117 | B2 | * | 4/2003 | Moos et al. ................ 524/504 |
| 6,579,928 | B2 | * | 6/2003 | Grandhee ................... 524/457 |
| 6,635,706 | B1 | * | 10/2003 | Petschke et al. ............ 524/589 |

FOREIGN PATENT DOCUMENTS

CA          2314523          7/1999

OTHER PUBLICATIONS

Database WPI, Section Ch, Week 199121, Derwent Publications Ltd., London, GB, Class A25, AN 1991–152203, XP002169292 & JP 03 086713, A (Mitsui Toatsu Chem Inc), Apr. 11, 1991.
Database WPI, Section Ch, Week 199519, Derwent Publications Ltd., London, GB; Class A17, AN 1995–144208, XP002169293, & JP 07 068551, A (Mitsubishi Petrochemical Co Ltd), Mar. 14, 1995.
Database WPI, Section Ch, Week 199731, Derwent Publications Ltd., London, GB, Class A14, AN 1997–337207, XP002169402, & JP 09 137087, A (Nissei Sangyo KK), May 27, 1997.

* cited by examiner

*Primary Examiner*—Judy M. Reddick
(74) *Attorney, Agent, or Firm*—Joseph C. Gil; Thomas W. Roy

(57) ABSTRACT

The present invention relates to light fast, aqueous, strippable coating compositions containing A) 40 to 90 wt. %, based on resin solids of A) and B), of aqueous polyurethane-polyureas and B) 10 to 60 wt. %, based on resin solids of A) and B), of polymers prepared from radically polymerizable monomers, wherein the percentages of A) and B) add up to 100, based on the weight of resin solids of A) and B). The present invention relates also to substrates coated with these strippable coating compositions. In addition, the present invention relates to the use of the stripped coatings as recycled material by mechanically comminuting the stripped coatings, optionally after cleaning, and then either pressing them in heatable presses to form sheets, or extruding them in an extruder to form endless thermoplastic threads, and then processing the resulting threads by known granulating methods to form cylindrical, spherical, lenticular or rhombic granules. Finally, the present invention relates to the use of the resulting thermoplastic granules for the production of articles by known processes such as injection molding, blow molding, deep-drawing, slush molding or flat extrusion.

6 Claims, No Drawings

STRIPPABLE COATING COMPOSITIONS

BACKGROUND OF THE INVENTION

1. Field of the Invention

The present invention relates to aqueous strippable coating compositions containing polyurethane-polyureas and polymers prepared from radically polymerizable monomers.

2. Description of the Prior Art

Aqueous coating compositions which are suitable for protecting high quality goods, in particular for the protection of lacquer surfaces of, for example, motor vehicles, are known. DE-A 19 653 585 relates to cosolvent-free, aqueous, anionic polyurethane dispersions which are also used as strippable lacquers for the temporary protection of high quality consumer goods. The tear resistance and the stretchability of the lacquer layers are relatively high.

WO 98/23692 discloses known mixtures of an aqueous copolymer dispersion of acrylic esters with an aqueous ethylene/vinyl acetate copolymer dispersion, which mixtures are used as strippable coating compositions.

The mixtures produce a satin finish protective coating, which is strippable. In a test using 36% sulfuric acid at 65° C. it was found that the clear lacquer surface provided with the protective coating is protected against initial, visually perceptible damage for at least 30 minutes longer than the unprotected clear lacquer surface.

Acrylate dispersions alone generally produce coatings which are highly weatherproof but are stiff and brittle. Soft acrylates have low tear resistance and resistance to tear propagation. The addition of thermoplastic copolymers of olefins with vinyl esters brings about a reduction in the stiffness and brittleness of the acrylate dispersions.

Thermoplastic copolymers of olefins with vinyl esters are not generally weather-resistant, however. In addition, the mixture produces a satin finish film.

Strippable coating compositions prepared from polyurethane dispersions, such as those described in DE-A 19 653 585, fulfil the requirement for transparency, weather resistance and strippability. However, the hardness, stretching and strippability of such lacquer layers need to be improved.

DE-A 19 943 933 describes mixtures of at least two mutually compatible, cosolvent-free, aqueous anionic polyurethane-polyurea dispersions A and B, which exhibit improved hardness, stretching and strippability properties. However, the cost of such high quality mixtures is high.

The users of these coating compositions desire higher hardness, lower stretchability and good tear resistance and resistance to tear propagation of the strippable coatings, and for a higher solids content of the dispersions used as strippable coating compositions. The lacquers should also be more readily strippable from a very wide variety of substrates, for example, glass, plastics and automotive coatings, than those of the prior art.

An object of the present invention is to provide aqueous polymer dispersions for strippable coating compositions which have a high solids content and may be used to prepare coatings that are transparent, weather-resistant and resistant to chemicals and, in terms of mechanical properties, fulfil all the requirements of a strippable coating composition, i.e., they can readily be stripped from the substrates and also can be produced in an economical manner.

This object may be achieved with aqueous dispersions of the present invention which are described in greater detail below.

Polyurethane-polyacrylate dispersions are well known and are preferably used as waterborne coatings for the production of base coats having good adhesion. It is therefore especially surprising, and was not predictable to persons skilled in the art, that the mixtures according to the invention and also the hybrid dispersions according to the invention (prepared by the in situ preparation of polyacrylates in polyurethanes) result in novel strippable coating compositions having excellent mechanical properties and strippability.

SUMMARY OF THE INVENTION

The present invention relates to light fast, aqueous, strippable coating compositions containing
A) 40 to 90 wt. %, based on resin solids of A) and B), of aqueous polyurethane-polyureas and
B) 10 to 60 wt. %, based on resin solids of A) and B), of polymers prepared from radically polymerizable monomers,
wherein the percentages of A) and B) add up to 100, based on the weight of resin solids of A) and B).

The present invention also relates to substrates coated with these strippable coating compositions.

In addition, the present invention relates to the use of the stripped coatings as recycled material by mechanically comminuting the stripped coatings, optionally after cleaning, and then either pressing them in heatable presses to form sheets, or extruding them in an extruder to form endless thermoplastic threads, and then processing the resulting threads by known granulating methods to form cylindrical, spherical, lenticular or rhombic granules.

Finally, the present invention relates to the use of the resulting thermoplastic granules for the production of articles by known processes such as injection molding, blow molding, deep-drawing, slush molding or flat extrusion.

DETAILED DESCRIPTION OF THE PRESENT INVENTION

Preferred polyurethane-polyureas A) contain the reaction product, present at least partially in salt form, of
a) an NCO prepolymer prepared from
   i) 20 to 60 wt. % of a diisocyanate selected from the group of aliphatic diisocyanates, cycloaliphatic diisocyanates and mixtures thereof,
   ii) 20 to 78 wt. % of macrodiols having a number average molecular weight of 500 to 10,000,
   iii) 2 to 12 wt. % of 2,2-bis-(hydroxymethyl)-alkane-monocarboxylic acids, preferably dimethylolpropionic acid,
   iv) 0 to 15 wt. % of short chain diols having a number average molecular weight of 62 to 400,
   v) 0 to 10 wt. % of monofunctional alcohols having a molecular weight of 32 to 350 as chain regulators,
wherein the percentages of i) to v) add up to 100, based on the weight of components i) to v), with
b) 0 to 15 wt. % of diamines having a molecular weight of 60 to 300 as chain-lengthening agents,
c) 0 to 10 wt. % of chain regulators selected from the group of monoamines, alkanolamines and ammonia,
d) 0 to 3 wt. % of water and
e) 0.1 to 10 wt. % of neutralizing agents,
wherein the percentages of a) to e) add up to 100, based on the weight of components a) to e).

Component B may be prepared by free radical aqueous emulsion polymerization of olefinically unsaturated compounds. Component B is preferably a polymer having a glass transition temperature above 10° C., more preferably above 20° C.

Component A) is present in an amount of 40 to 90 wt. %, preferably 60 to 80 wt. %, and component B) is present in an amount of 10 to 60 wt. %, preferably 20 to 40 wt. %, wherein the percentages are based on resin solids and preferably add up to 100 wt. %, based on the weight of A) and B).

The coating compositions according to the invention may be obtained by separating preparing at least two different cosolvent-free, aqueous dispersions A and B and then mixing them or by preparing polymer dispersion B) by radical emulsion polymerization in the presence of polyurethane dispersion A).

Suitable components a-i) include aliphatic and/or cycloaliphatic diisocyanates, such as isophorone diisocyanate (IPDI), 4,4'-dicyclohexyl-methane diisocyanate, 1-methyl-2,4- and/or -2,6-diisocyanato-cyclohexane, 1,6-hexamethylene diisocyanate, and/or 1,3-cyclohexane diisocyanate. The use of small amounts of aromatic diisocyanates, such as 2,4- and 2,6-toluene diisocyanate or 2,4'- and 4,4'-diphenylmethane diisocyanate, is also possible.

Suitable components a-ii) include macrodiols having a number average molecular weight of 500 to 10,000. They are preferably polyester diols prepared by reaction of dicarboxylic acids with diols, optionally in the presence of known esterification catalysts, preferably by melt or azeotropic condensation, at temperatures of 140 to 240° C.

Examples of suitable acids or anhydrides include adipic acid, succinic acid (anhydride), maleic acid (anhydride), sebacic acid, azelaic acid, the commercially available dimeric fatty acids (in hydrogenated and unhydrogenated form), phthalic acid (anhydride), isophthalic acid, tetrahydrophthalic acid (anhydride), 1,4-cyclohexanedicarboxylic acid and hexahydrophthalic acid (anhydride). Examples of suitable diols are those that are commercially available and include ethylene glycol, 1,2- and 1,3-propanediol, 1,3- and 1,4-butanediol, 1,6-hexanediol, diethylene glycol, dipropylene glycol, neopentyl glycol and mixtures of these diols. Preferred are polyester diols prepared from adipic acid, hexanediol and neopentyl glycol.

Also suitable as component a-ii) are polycarbonate diols, polyacrylate diols (e.g. Tegomer BD 1000, Tego Chemie Service GmbH, DE), polybutadiene diols, polycaprolactone diols, hydroxypolytetra-hydrofurans or hydroxy polyethers based on propylene oxide.

Suitable polycarbonate diols may be obtained by reacting carbonic acid derivatives, such as diphenyl carbonate or phosgene, with alcohols, preferably the diols previously disclosed.

The number average molecular weights of these polyols is 500 to 10,000, preferably 700 to 4000 and more preferably 1000 to 2500.

Starting components a-ii) may also contain olefinically unsaturated units.

Suitable starting components a) iii) include 2,2-bis-(hydroxymethyl)-alkane-monocarboxylic acids having a total of 5 to 8 carbon atoms, such as the compounds of formula (I)

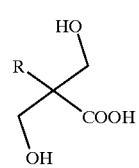

wherein
R represents an alkyl radical having from 1 to 4 carbon atoms.

2,2-dimethylolpropionic acid is especially preferred.

Suitable starting components a-iv) include the previously described short chain diols having a number average molecular weight of 62 to 400. 1,4-butanediol is particularly preferred.

Suitable starting components a-v) include methanol, ethanol, butanol, hexanol, 2-ethylhexanol, octanol, dodecanol, and other alcohols having a molecular weight of 32 to 350. Olefinically unsaturated alcohols, such as hydroxyethyl acrylate, hydroxyethyl methacrylate, hydroxypropyl methacrylate and allyl alcohol, are also suitable.

Suitable starting components b) include aliphatic and/or cycloaliphatic compounds containing at least two amino groups that are reactive to isocyanate groups. Preferred are ethylenediamine, propylenediamine, hexamethylenediamine, isophoronediamine, p-xylylenediamine, 4,4'-diaminodicyclohexylmethane and 4,4'-diamino-3,3'-dimethyldicyclohexylmethane.

Suitable starting components c) include ammonia; monofunctional amines such as methylamine, ethylamine, n-propylamine, isopropylamine, cyclohexylamine, octylamine, diethylamine and dibutylamine; and amino alcohols such as ethanolamine, diethanolamine and propanolamine.

Suitable neutralizing agents e) include ammonia, N-methylmorpholine, dimethylisopropanolamine, triethylamine, dimethylethanolamine, methyldiethanolamine, triethanolamine, 2-amino-2-methyl-1-propanol, morpholine, tripropylamine, ethanolamine, diethanolamine, triisopropanolamine, N-ethyl-diisopropylamine and mixtures thereof.

In a preferred embodiment, components a-i), a-ii) and a-iii) are placed in a reactor and reacted under anhydrous conditions at a temperature of 50 to 150° C., preferably 50 to 110° C. The batch is then cooled and commercially pure acetone, short chain diols a-iv) and monofunctional alcohols a-v) are added. Heating is carried out until the NCO content of the mixture has fallen to a value of 65 to 85%, preferably 75 to 80%, of the calculated NCO content. The NCO prepolymer a) is formed in this manner. The batch is subsequently diluted with further acetone, and the calculated amount of a mixture of diamine and chain terminator dissolved in water is added. In that manner, 90% of the NCO-groups are reacted with the diamine chain-lengthening agent and the chain terminator. The remaining isocyanate groups react with the water that is present to form polyurethane-polyurea A).

Instead of acetone, other organic solvents having a suitable boiling point, which are known to the person skilled in the art, may also be used to dilute the prepolymer. Examples include methyl ethyl ketone and (cyclo)aliphatic hydrocarbons. The use of solvents that remain in the dispersion, such as N-methylpyrrolidone, dipropylene glycol dimethyl ether and methoxypropyl acetate, is also possible.

In a further preferred embodiment, radically polymerizable monomers are used for dilution. Suitable monomers include those described hereinafter for the preparation of component B).

The preparation of component A) is preferably carried out without the use of catalysts, but it is also possible to use the known catalysts from isocyanate chemistry, e.g., tertiary amines such as triethylamine, and tin compounds such as tin(II) octoate and dibutyltin dilaurate.

When the desired conversion has been achieved, for example when no more NCO can be detected (IR monitoring), an amount of neutralizing agent, preferably an ammonia solution, is added to the batch such that 30 to 100%, preferably 40 to 60%, of the carboxyl groups present are neutralized.

The desired solids concentration is adjusted by adding water and subsequently removing acetone by distillation. The resulting white, storage stable, polyurethane-polyurea dispersions have a solids content of 20 to 60 wt. %, preferably from 30 to 40 wt. %; a mean particle diameter of 20 to 1000 nm, preferably 50 to 500 nm; and a pH of 6 to 9.

Component B is a polymer prepared by radical aqueous emulsion polymerization of olefinically unsaturated monomers. Suitable monomers include styrene; (meth)acrylic acid esters having 1 to 18 carbon atoms in the alcohol radical, such as methyl methacrylate, butyl methacrylate, ethyl acrylate, butyl acrylate, cyclohexyl acrylate, 2-ethylhexyl acrylate, stearyl acrylate, di(meth)acrylic acid esters of diols (for example, ethylene glycol, 1,4-butanediol and 1,6-hexanediol); (meth)acrylic acid amide; (meth) acrylic acid nitrile; and vinyl esters of aliphatic carboxylic acids having from 2 to 12 carbon atoms, such as vinyl acetate and versatic acid vinyl ester. Also suitable are such monomers having functional groups, for example, hydroxy, carbonyl or acid groups. Examples include hydroxyethyl acrylate, hydroxyethyl methacrylate, hydroxypropyl methacrylate, acetoxyethyl methacrylate, acrylic acid and methacrylic acid.

The polymerization is preferably carried out by aqueous emulsion polymerization. Emulsion copolymerization of the above-mentioned monomers initiated by radical initiators is carried out. In a further preferred embodiment, the emulsion polymerization is carried out in the presence of the polyurethane dispersion A). The emulsion polymerization may be carried out either by placing the polyurethane dispersion and/or a surface-active substance in a vessel and then metering in the monomers and the initiator separately over a period of, for example, 0.5 to 6 hours. Alternatively, it may be carried out by placing a portion of the polyurethane dispersion and/or a surface-active substance in a vessel and metering in the remainder together with the monomers and the initiator in separate streams over a period of, for example, 0.5 to 6 hours.

However, it is also possible to proceed by metering in polyurethane dispersion and/or surface-active substance, monomers and initiator separately and continuously over the entire duration of the polymerization and placing only a particular amount of water in the vessel initially. That type of polymerization is also suitable for carrying out a batch procedure, i.e., a polyurethane dispersion and/or a surface-active substance, a monomer mixture and initiator are together placed in a vessel, heated to the desired polymerization temperature and maintained at that temperature for 2 to 10 hours.

Suitable initiators include potassium peroxodisulfate, ammonium peroxodisulfate, organic peroxides, organic hydroperoxides, hydrogen peroxide and, preferably, redox systems. Particularly preferred are redox systems of water-soluble, radical-supplying, non-ionic peroxides, such as t-butyl hydroperoxide, as the oxidizing component, and reducing components, such as formaldehyde sulfoxylate or ascorbic acid, as well as catalytic amounts of an iron(II) salt.

The emulsion polymerization generally takes place at temperatures of 20° C. to 100° C., preferably 40° C. to 80° C.

After completion of the polymerization reaction, a finely divided aqueous polymer emulsion having a mean particle diameter, measured by laser correlation spectroscopy, of 15 to 500 nm, preferably 30 to 150 nm, is obtained.

In addition to homo-and/or co-polymers of the monomers or monomer mixtures used for the polymerization, the dispersion also contains amounts of graft products of the monomers, which are grafted either onto double bonds (introduced by the incorporation of unsaturated OH components into component A) or onto the polymer chains of the polyurethane as graft base.

The dispersions according to the invention may be used to produce coatings which are glossy, highly transparent and hard and have a high degree of body and good strippability from the substrates, for example, glass, plastics and automotive coatings. The coatings, which may optionally be pigmented, are waterproof, resistant to tearing, UV-resistant, temperature-stable, stable to deposits (of organic or inorganic nature), and adhere to the substrates, but can readily be removed by stripping.

The coating compositions may contain known additives such as pigments, light stabilizers, antisettling agents, thickeners, surface-active compounds and antifoaming agents.

The pH of the mixtures may optionally be altered with organic or inorganic bases, such as ammonia, alkali metal carbonates, amines and amino alcohols. Preferred are organic bases. 2-Amino-2-methyl-1-propanol is especially preferred.

The coating compositions may be applied by the known methods of lacquer technology, such as immersion, knife application, pouring, spraying, atomizing, brushing or roller application. They are used as strippable coating compositions for temporarily protecting motor vehicles, trains, ships, furniture, metal objects, mineral objects, steel and aluminum profiles, and sheets or articles of glass and plastics. After application, the coated parts are dried at 20 to 100° C., preferably 20 to 80° C., by heat radiation, hot air or infrared light, microwave irradiation or exposure to ultrasonic waves.

Recycling of the used, stripped coatings is not difficult. The used, coatings are comminuted mechanically, optionally after previously being cleaned. The comminuted coatings are then pressed in heatable presses with the application of temperature and pressure to form sheets, or they are extruded in an extruder with the application of temperature, shear and feeding, to form endless thermoplastic threads. The resulting threads are granulated by known granulating methods to form cylindrical, spherical, lenticular or rhombic granules. These granules may be used for the production of commercial articles as thermoplastic elastomers by further processing in known processes of plastics technology, for example by injection molding, blow molding, deep-drawing, slush molding or flat extrusion.

The invention is further illustrated but is not intended to be limited by the following examples in which all parts and percentages are by weight unless otherwise specified.

EXAMPLES

Example 1

Polyurethane-polyurea Dispersion

In a reaction vessel 170 g (0.1 mol) of a polyester of adipic acid, 1,6-hexanediol and neopentyl glycol (molar ratio of glycols 65:35) having an average molecular weight of 1700 g/mol and 2% OH were dehydrated for 30 minutes at 120° C. and 10 mbar with stirring. Under nitrogen 13.4 g (0.1 mol) of dimethylolpropionic acid and 111 g (0.5 mol) of isophorone diisocyanate were introduced. After a reaction time of one hour at 110° C., the batch was cooled to 60° C. and dissolved in 100 g of acetone. After the addition of 18 g (0.2 mol) of 1,4-butanediol, the mixture was stirred for 22 hours at 50° C. The NCO content was 1.60% (calculated 2.04%). The mixture was diluted with 500 g of acetone. A mixture of 10.6 g (0.062 mol) of isophoronediamine, 1.07 g (0.016 mol) of a 25% ammonia solution and 60 g of water was added to the NCO prepolymer at 50° C. Stirring was then carried out for 5 hours at 50° C. The mixture was neutralized with 3.4 g (0.05 mol) of a 25% ammonia solution and dispersed using 450 g of water. The acetone was removed to 50° C. and 150 mbar, yielding a white dispersion having a solids content of 38.8 wt. % and a mean particle size of 346 nm. The degree of neutralization was 50%.

Example 2

Polyurethane-polyurea Dispersion

In a reaction vessel 170 g (0.1 mol) of the polyester from Example 1 were dehydrated for 30 minutes at 120° C. and 10 mbar with stirring. Under nitrogen 13.4 g (0.1 mol) of dimethylolpropionic acid and 111 g (0.5 mol) of isophorone diisocyanate were introduced. After a reaction time of one hour at 110° C., the batch was cooled to 60° C. and dissolved in 100 g of acetone. After the addition of 18 g (0.2 mol) of 1,4-butanediol, the mixture was stirred for 22 hours at 50° C. The NCO content was 1.66% (calculated 2.04%). The mixture was diluted with 500 g of acetone. A mixture of 9.42 g (0.055 mol) of isophoronediamine, 2.00 g (0.029 mol) of a 25% ammonia solution and 60 g of water was added to the NCO prepolymer at 50° C. Stirring was then carried out for 5 hours at 50° C. The mixture was neutralized with 3.4 g (0.05 mol) of a 25% ammonia solution and dispersed using 450 g of water. The acetone was removed to 50° C. and 150 mbar, yielding a white dispersion having a solids content of 39.2 wt. % and a mean particle size of 471 nm. The degree of neutralization was 50%.

Example 3

Polyurethane-polyurea Dispersion

Example 1 was repeated with the exception that the ammonia neutralizing agent was replaced with 3.56 g (0.04 mol) of dimethylethanolamine. After removal of the acetone, a white dispersion having a solids content of 35% and a mean particle size of 309 nm was obtained. The degree of neutralization was 40%.

Example 4

Polyurethane-polyurea Dispersion

Example 1 was repeated with the exception that neutralization was carried out using 4.08 g (0.06 mol) of a 25% ammonia solution, and 680 g of water were used for the dispersion. After removal of the acetone, a white dispersion having a solids content of 31.4% and a mean particle size of 183 nm was obtained. The degree of neutralization was 60%.

Example 5

Polyurethane-polyurea Dispersion

In a reaction vessel 245.1 g (0.125 mol) of a polyester of adipic acid, 1,2-ethanediol and 1,4-butanediol having an average molecular weight of 1961 g/mol and 1.73% OH were dehydrated for 30 minutes at 120° C. and 10 mbar. Under nitrogen 16.75 g (0.125 mol) of dimethylol-propionic acid and 131 g (0.5 mol) of dicyclohexylmethane 4,4'-diisocyanate were introduced. After a reaction time of one hour at 110° C., the batch was cooled to 80° C. and dissolved in 250 g of 2-butanone. After the addition of 11.25 g (0.125 mol) of 1,4-butanediol, the mixture was stirred for 12 hours at 80° C. The NCO content was 1.36% (calculated 1.61%). The mixture was diluted at 50° C. with 500 g of acetone. A mixture of 13.6 g (0.08 mol) of isophoronediamine, 1.36 g (0.02 mol) of a 25% ammonia solution and 100 g of water was added to the NCO prepolymer at 50° C. Stirring was then carried out for one hour at 50° C. The mixture was neutralized with 4.45 g (0.05 mol) of dimethylethanolamine and dispersed using 530 g of water. After removal of the organic solvents to 50° C. and 150 mbar, a white dispersion having a solids content of 38.7% and a mean particle size of 480 nm was obtained. The degree of neutralization was 40%.

Example 6

Polyurethane-polyurea Dispersion

In a reaction vessel 170 g (0.1 mol) of the polyester from Example 1 were dehydrated for 30 minutes at 120° C. and 10 mbar with stirring. Under nitrogen 13.4 g (0.1 mol) of dimethylolpropionic acid and 111 g (0.5 mol) of isophorone diisocyanate were introduced. After a reaction time of one hour at 110° C., the batch was cooled to 60° C. and dissolved in 100 g of acetone. After the addition of 18 g (0.2 mol) of 1,4-butanediol, the mixture was stirred for 21 hours at 50° C. The NCO content was 1.63% (calculated 2.04%). The mixture was diluted with 500 g of acetone. A mixture of 1.09 g (0.016 mol) of a 25% ammonia solution and 60 g of water was added to the NCO prepolymer at 50° C., and stirring was then carried out for 21 hours at 50° C. The mixture was neutralized with 3.4 g (0.05 mol) of 25% ammonia solution and dispersed using 450 g of water. After removal of the acetone to 50° C. and 150 mbar, a white dispersion having a solids content of 39.8% and a mean particle size of 210 nm was obtained. The degree of neutralization was 50%.

Example 7

Polyurethane-polyurea Dispersion

In a reaction vessel 765.0 g (0.45 mol) of the polyester Example 1 were dehydrated for 30 minutes at 120° C. and 10 mbar with stirring. Under nitrogen 73.7 g (0.55 mol) of dimethylolpropionic acid, 2.8 g (0.03 mol) of ethylene glycol monobutyl ether and 40.5 g (0.45 mol) of 1,4-butanediol were introduced. The mixture was heated to 70° C., and 455.1 g (2.0 mol) of IPDI were added with stirring. After heating to 92° C. stirring was carried out for one hour. The mixture was cooled to 70° C., and 236.8 g of butyl methacrylate and 0.25 g of Desmorapid Z (Bayer AG, DE) were added. After a further 90 minutes at 70° C., the NCO content was 3.5%. 55.6 g (0.55 mol) of triethylamine were added, and the mixture was stirred for a further 30 minutes at 70° C. The resulting melt was introduced over a period of 10 minutes with stirring into 1740 g of water having a temperature of 33° C. After addition of the resin melt, a solution of 16.0 g (0.53 mol) of ethylenediamine and 7.3 g (0.29 mol) of hydrazine hydrate in 193 g of water was added over a period of 5 minutes. An opaque dispersion having a solids content of 36.2% and a mean particle size of 68 nm was obtained. The degree of neutralization was 100%.

Example 8

Polyurethane-polyurea/polymer Dispersion 1665 g of the polyurethane-polyurea dispersion of Example 1 were placed in a stirred vessel. While stirring 3.1 g of a solution of ethylenediamine tetraacetate and iron(II) sulfate (each 1% in water), diluted with a further 347 g of water were added. A mixture of 3.3 g of a 70% solution of t-butyl hydroperoxide in water and 347 g of water was then added, with stirring.

111 g of butyl acrylate and 222 g of methyl methacrylate were weighed into a dropping funnel (monomer batch). A solution of 1.7 g of formaldehyde sulfoxylate in 165 g of water was weighed into a further dropping funnel. 25% of each of the formaldehyde sulfoxylate solution and the monomer batch were then metered in at 50° C. over a period of 5 minutes. When the exothermic reaction had subsided, the remainder of the monomer batch and the formaldehyde sulfoxylate solution were metered in parallel over a period of one hour. The mixture was then stirred for a further one hour at 50° C. and cooled. The resulting white dispersion had a solids content of 34.5% and a mean particle size of 445 nm.

Example 9

Polyurethane-polyurea/Polymer Dispersion 1500 g of the polyurethane-polyurea dispersion of Example 7 were placed in a stirred vessel and diluted with 270 g of water. While stirring 1.4 g of a solution of ethylenediamine tetraacetate and iron(II) sulfate (each 1% in water) were added. A mixture of 0.9 g of a 70% aqueous solution of t-butyl hydroperoxide and 17 g of water was then added with stirring. A solution of 0.45 g of formaldehyde sulfoxylate in 8.6 g of water was then added dropwise at 50° C. over a period of 5 minutes. Stirring was then carried out for a further 2 hours at 50° C. The resulting opaque dispersion had a solids content of 34.2% and a mean particle size of 58 nm.

Example 10

Polymer Dispersion 560.6 g of water and 9.4 g of emulsifier 951 (Bayer AG, DE) were placed in a stirred vessel and heated to 75° C. 248 g of butyl acrylate, 248 g of methyl methacrylate and 5.0 g of acrylic acid were weighed into a dropping funnel (monomer batch). 10.0 g of a 5% aqueous solution of ammonium peroxodisulfate in water and 10% of the monomer batch were then metered in in parallel over a period of 5 minutes with stirring. When the exothermic reaction had subsided, 50 g of a 1% ammonium peroxodisulfate solution was added over a period of 3.5 hours and the remainder of the monomer batch was added over a period of 3 hours, beginning at the same time. Stirring was then carried out for a further 2 hours at 75° C. After cooling to room temperature, the pH was adjusted to 8.0 using a 25% aqueous ammonia solution. The opaque dispersion had a solids content of 44.3% and a mean particle size of 92 nm.

Example 11

Polymer Dispersion 672 g of water and 11.3 g of emulsifier 951 (Bayer AG, DE) were placed in a stirred vessel and heated to 75° C. 177 g of butyl acrylate, 208 g of methyl methacrylate, 208 g of styrene and 6.0 g of methacrylic acid were weighed into a dropping funnel (monomer batch). 12.0 g of a 5% aqueous solution of ammonium peroxodisulfate in water and 10% of the monomer batch were then metered in parallel over a period of 5 minutes with stirring. When the exothermic reaction had subsided, 60 g of a 5% ammonium peroxodisulfate solution were added over a period of 3.5 hours and the remainder of the monomer batch was added over a period of 3 hours, beginning at the same time. Stirring was then carried out for a further 2 hours at 75° C. After cooling to room temperature, the pH was adjusted to 8.0 using a 10% aqueous ammonia solution. The opaque dispersion had a solids content of 44.8% and a mean particle size of 62 nm.

Example 12

Production of a Strippable Coating Composition a) Transparent formulation 70.9 parts of the polyurethane-polyurea dispersion of Example 2 (39.2% solids) were mixed with stirring with 26.5 parts of the 44.3% polymer dispersion of Example 10 and adjusted to a pH value of approximately 8.3 using approximately 0.4 parts by weight of 90% aminomethylpropanol. 0.2 parts of a commercially available acrylate thickener (Borchigel A LA, Borchers GmbH, Monheim, Del.), 10% in distilled water, 1.1 parts of a 1% commercially available antifoamer (antifoamer E, Bayer AG), 0.5 part by weight of a wetting agent (Hydropalat 110, Cognis BV, Roermond, NL) and 0.4 parts of a water-dilutable light stabilizer were then added rapidly and mixed intimately by means of a dissolver. After a maturing time of approximately 8 hours at 23° C., the system was ready for use for an airless spray application.

b) White-glazing formulation 68.9 parts of the polyurethane-polyurea dispersion of Example 2 (39.2% solids) were mixed with stirring with 24.9 parts of the 44.3% polymer dispersion of Example 10 and adjusted to a pH value of approximately 8.3 using approximately 0.4 parts of 90% aminomethylpropanol. 4.6 parts by weight of the milling paste set forth below, 0.2 parts of a commercially available acrylate thickener (Borchigel A LA, Borchers GmbH, Monheim), 10% in distilled water, 1.1 parts of a 1% commercially available antifoamer (antifoamer E, Bayer AG), 0.5 parts of a wetting agent Hydropalat 110, Cognis BV, Roermond, NL) and 0.4 parts of a water-dilutable light stabilizer were then added rapidly and mixed intimately by means of a dissolver. After a maturing time of approximately 8 hours at 23° C., the system was ready for use for an airless spray application.

The milling paste, which was ground after pre-dispersion by means of a dissolver for approximately 30 minutes in a bead mill with cooling, contained 42.2 parts of dispersion A, 11.8 parts of dispersion B, 3.7 parts by weight of distilled water and 41.5 parts by weight of titanium dioxide (Tronox R-KB-4, Kerr McGee Pigments GmbH & Co. KG, DE), 0.5 parts of wetting agent (Tego Wet 250, Tego Chemie Service GmbH, DE) and 0.3 parts of an antisettling agent (Aerosil R 972, Degussa AG, DE).

| Properties of transparent strippable coating compositions based on dispersions A, B and A/B = 70:30 | | | |
|---|---|---|---|
| Example | 2 | 10 | 12a) |
| Binder (solid resins) | Disp. A: 100.0 parts by weight | Disp. B: 100.0 parts by weight | Disp. A: 70.0 parts by weight Disp. B: 30.0 parts by weight |

-continued

Properties of transparent strippable coating compositions based on dispersions A, B and A/B = 70:30

| Example | 2 | 10 | 12a) |
|---|---|---|---|
| Solids content at approx. 65 s Runout time ISO 2431, 5 mm | approx. 39.2 wt. % | approx. 44.3 wt. % | approx. 40.7 wt. % |
| Films having a dry layer thickness of approx. 50 μm after 10 minutes at 80° C. and accelerated ageing for 48 hours at 40° C. | | | |
| Appearance | clear transparent | highly cracked no film formation | clear transparent |
| Stretchability of the free film | approx. 350% | 0% | approx. 300% |
| Strippability (manual test) | | | |
| from glass | moderate to difficult | indeterminable | easy to moderate |
| from 2K automotive clear lacquer | easy to moderate | indeterminable | easy |
| Protecting action on the substrate (2K clear lacquer) Key: 0 = no change 5 = completely destroyed | | | |
| FAM* test, 10 min. RT | 2 | — | 2 |
| 1% NaOH, 30 min. 40° C. | 0 | — | 0 |
| 1% $H_2SO_4$, 30 min. 40° C. | 0 | — | 0 |
| Pancreatin, 30 min. 40° C. | 1 | — | 0 |

*Mixture of xylene:isooctane:diisobutylene:ethanol = 50:30:15:5 parts by weight

Although the invention has been described in detail in the foregoing for the purpose of illustration, it was to be understood that such detail is solely for that purpose and that variations can be made therein by those skilled in the art without departing from the spirit and scope of the invention except as it may be limited by the claims.

What is claimed is:

1. A light fast, aqueous, strippable coating composition comprising
    A) 40 to 90 wt. %, based on resin solids of A) and B), of an aqueous polyurethane-polyurea dispersion comprising the reaction product of a diisocyanate, a polyester-polyol based on adipic acid, 1,6-hexanediol and neopentylglycol, and a 2,2-bis-(hydroxymethyl)-alkane-monocarboxylic acid, and
    B) 10 to 60 wt. %, based on resin solids of A) and B), of a polymer prepared from radically polymerizable monomers,
    wherein the percentages of A) and B) add up to 100, based on the weight of resin solids of A) and B) and wherein B) is prepared by emulsion polymerization in the presence of A) and a portion of the monomers in B) are grafted onto the polyurethane-polyurea in A).

2. The strippable coating composition of claim 1, wherein component A is the reaction product, present at least partially in salt form, of
    a) an NCO prepolymer prepared from
        i) 20 to 60 wt. % of an aliphatic diisocyanate or a cycloaliphatic diisocyanate,
        ii) 20 to 78 wt. % of a macrodiol having a number average molecular weight of 500 to 10,000,
        iii) 2 to 12 wt. % of a 2,2-bis-(hydroxymethyl)-alkane-monocarboxylic acid,
        iv) 0 to 15 wt. % of a short chain diol having a number average molecular weight of 62 to 400,
        v) 0 to 10 wt. % of a monofunctional alcohol having a number average molecular weight of 32 to 350 as a chain regulator,
        wherein the percentages of i) to v) add up to 100, based on the weight of components i) to v), with
    b) 0 to 15 wt. % of a diamine having a molecular weight of 60 to 300 as a chain-lengthening agent,
    c) 0 to 10 wt. % of a monoamine, alkanolamine or ammonia chain regulator,
    d) 0 to 3 wt. % of water and
    e) 0.1 to 10 wt. % of a neutralizing agent,
    wherein the percentages of a) to e) add up to 100, based on the weight of components a) to e).

3. The strippable coating composition of claim 2 wherein the NCO content of the NCO prepolymer is 65 to 85% of the calculated NCO content.

4. A light fast, aqueous, strippable coating composition comprising
    A) 40 to 90 wt. %, based on resin solids of A) and B), of an aqueous polyurethane-polyurea dispersion comprising the reaction product of a diisocyanate, a polyester-poiyol based on adipic acid, 1,6-hexanediol and neopentylglycol, and a 2,2-bis-(hydroxymethyl)-alkane-monocarboxylic acid, prepared in the presence of an olefinically unsaturated monomer and
    B) 10 to 60 wt. %, based on resin solids of A) and B), of a polymer prepared from radically polymerizable monomers,
    wherein the percentages of A) and B) add up to 100, based on the weight of resin solids of A) and B) and a portion of the monomers in B) are grafted onto the polyurethane-polyurea in A).

5. The strippable coating composition of claim 1 wherein component B has a glass transition temperature above 10° C.

6. The strippable coating composition of claim 1 wherein component A) is present in an amount of 60 to 80 wt. % and component B) is present in an amount of from 20 to 40 wt. %, wherein the percentages are based on resin solids of A) and B) and the percentages of A) and B) add up to 100, based on the weight of resin solids of A) and B).

* * * * *